Feb. 11, 1930.    W. A. DARRAH    1,746,525
PROCESS OF AUTOMATICALLY MEASURING AND APPARATUS THEREFOR
Filed Oct. 29, 1928    2 Sheets-Sheet 1
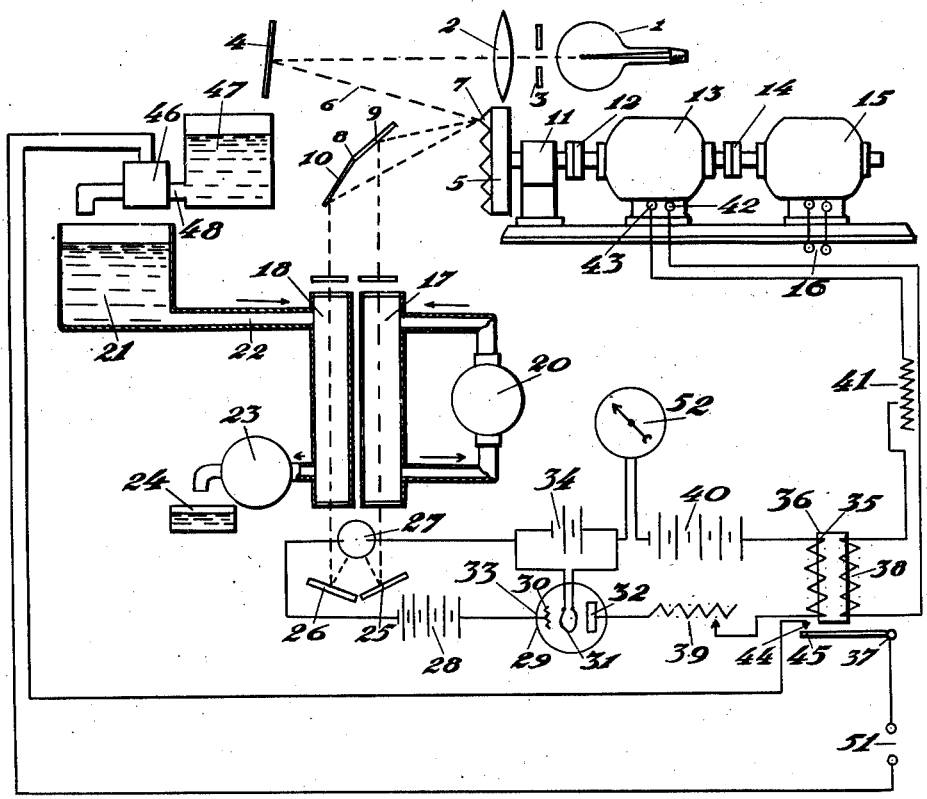
FIGURE I
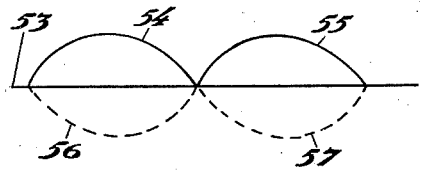
FIGURE III
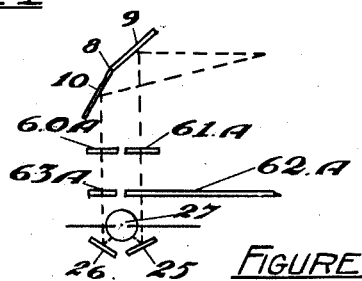
FIGURE II
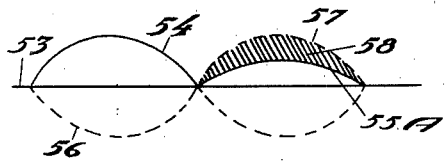
FIGURE III
William A. Darrah,
INVENTOR.

Feb. 11, 1930.  W. A. DARRAH  1,746,525
PROCESS OF AUTOMATICALLY MEASURING AND APPARATUS THEREFOR
Filed Oct. 29, 1928   2 Sheets-Sheet 2
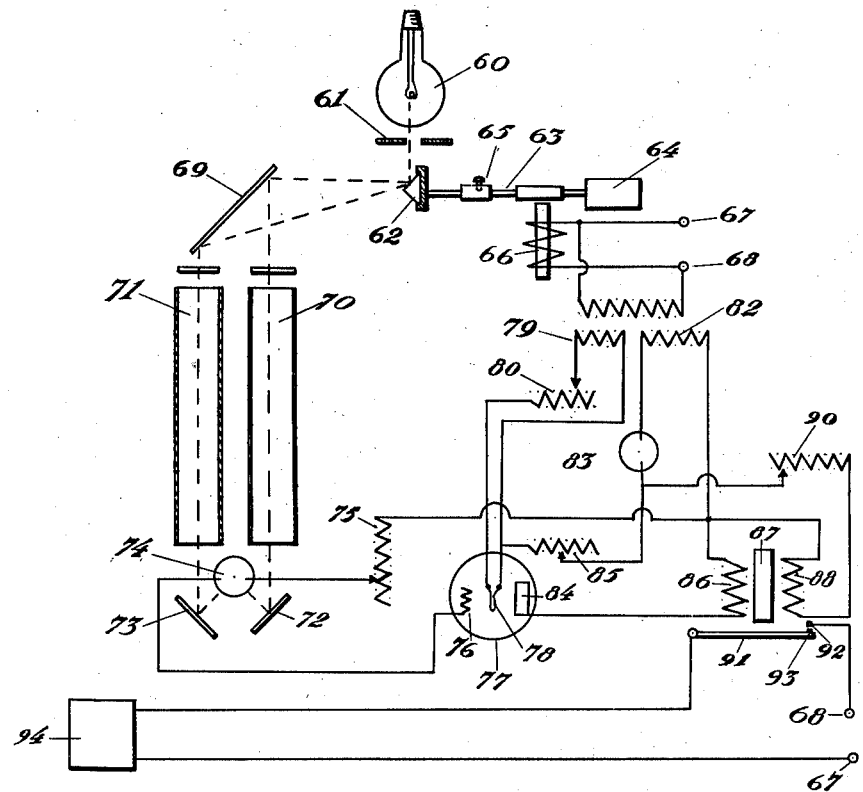
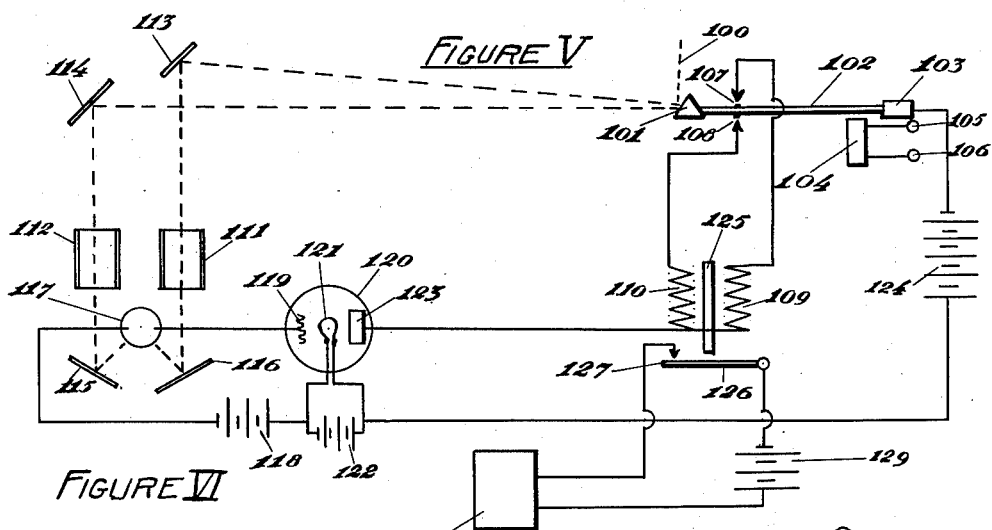
William A. Darrah,
INVENTOR.

Patented Feb. 11, 1930

1,746,525

UNITED STATES PATENT OFFICE

WILLIAM A. DARRAH, OF CHICAGO, ILLINOIS

PROCESS OF AUTOMATICALLY MEASURING AND APPARATUS THEREFOR

Application filed October 29, 1928. Serial No. 315,886. REISSUED

This invention relates to equipment and methods for automatically measuring differences in light transmission. Among the objects of this invention are to provide economical, simple and quick responding means for controlling various processes and operations by means of the transparency of certain products which takes place in the operation.

For example one application of this invention is the control of combustion in order to obtain smokeless combustion, by the absorption of light through a given column of furnace gases. Another application of this process and equipment is in connection with the filtering or bleaching of solutions such as for example sugar or syrup solutions and for instance during the refining operation.

Another application is in the difference of materials such as dyes or the addition of indicators to solutions, the change in light transmission of the solution serving to operate an indicator as well as a control.

Another application of this device is the measurement of the thickness of a sheet of material such as paper by the absorption of light of a sheet of different thicknesses. This process may also be employed in the application of coatings where the thickness of the coating is controlled by its power to restrict the passage of light through the coating.

This equipment may also be employed in such operations as the control of density of a suspended material such as wood pulp in a solution.

The equipment has the advantage of giving an accurate immediate response to variations in light conductivity of gases, liquids, solids or dispersions and of permitting such variations in light transmission to operate control means for maintaining any desired constant condition.

The equipment is relatively inexpensive, sensitive and may be installed without damaging in any manner the product which is being controlled.

Other objects will be apparent from a consideration of the drawings, specification and claims attached hereto.

Referring to the drawings, Figure 1 shows a diagrammatic view of one form of the equipment which constitutes my invention adapted to control a liquid or gaseous medium;

Figure 2 shows diagrammatically a portion of the equipment modified to control such a factor as the thickness of a sheet of paper during its manufacture;

Figure 3 shows the relative electrical characteristics occurring during the operation of my equipment in case of a balance, while Figure 4 shows the electrical conditions existing in my equipment in cases of unbalanced or when the control equipment is functioning;

Figures 5 and 6 show modified arrangements of the apparatus for accomplishing the results set forth.

Referring to Figure 1 (1) represents a source of light for example an ordinary incandescent light preferably of high intensity. The bulb of lamp (1) may be colored to obtain any desired grouping of wave lengths which is most satisfactory for the measurements in hand. Ordinarily the shorter wave lengths are desirable and in many cases it is an advantage to use for the source of light (1) a mercury arc lamp in a quartz or glass tube. (2) indicates a lens or concentrating device which if desired may be omitted or may be replaced by a slotted screen which is shown also as (3). (4) indicates a mirror which receives the light from source and reflects it to rotating device 5. It will be understood that the object of this equipment is to throw a uniform beam of light intermittently through a substance to be tested or controlled and a standard or comparison substance. I, therefore, do not wish to be confined to any set method of accomplishing this result and the equipment indicated here is shown for purposes of clearness and ease of description many changes being obviously possible and still falling within the scope of this invention.

Rotating member (5) carries a series of mirrors or reflecting members such as prisms, so arranged that as the member (5) rotates the beam of light indicated by (6) which falls on prism member (7) is reflected to mirror (8) alternately to position (9) and position

(10) as shown by dotted line. As rotary member (5) revolves, the light is passed back and forth between the two points indicated. Rotary member (5) is shown carried in bearing (11) and connected by coupling (12) to generator (13) which in turn is connected by coupling (14) to motor (15) which is supplied with power from any desired source as indicated by (16). In other words, motor (15) drives both generator (13) and rotating member (5) which are rigidly coupled together, thus maintaining a definite phase relation between the current produced by generator (13) and the travel of the light ray from rotating member (5).

The light rays from mirror (8) travel alternately through container (17) and container (18). For purposes of simplicity and description this equipment will be described as being applied to a liquid, but obvious modifications will make the equipment adaptable to either gases or solids. Container (17) is indicated as a standard or check solution carrying a sample of the liquid of the desired density and transparency while container (18) is intended to carry a continual uniform stream of the liquid whose transparency is being checked. (20) indicates a circulating device such as a pump arranged to maintain the liquid in container (17) in agitation both to prevent the settling of insoluble materials and to eliminate variations due to the agitation of the liquid in container (18).

(21) indicates a tank or container holding the material whose transparency is being checked. (22) indicates a duct or pipe taking a sample of the liquid in tank (21) to container (18) for test. (23) indicates another pump or circulating means for returning the sample liquid back to tank (24). If desired, the sample liquid may be allowed to go to waste in which case pump (23) can be neglected.

The light rays after passing alternately through containers (17) and (18) are reflected by means of mirrors (25) and (26) to a photo-electric cell (27). It will be apparent, therefore, that the photo-electric cell (27) is alternately excited by the ray of light first through the sample tube (18) and second through the sample tube (17) thus creating a varying electric current when the rays of light are of unequal photo-electric effect, but no change of current when the rays of light are of equal photo-electric effect. Since the solution to be tested and the standard solution are of the same material varying only in density, a change in density or light absorption of the solution being tested will cause a minute current to flow through photo-electric cell (27) when excited by battery (28).

The current passing through photo-electric cell (27) is amplified in any desired manner principally for the reason that the photo-electric currents at present available are too feeble to successfully operate relays or control equipment.

In Figure 1, I have shown diagrammatically a standard three electrode tube (29) similar to amplifiers now used in connection with radio applications or other high frequency equipment. Obviously, if desired, I may employ any other form of amplifier many of which are well known and form no part of this invention. For purposes of clearness however I will describe this equipment as illustrated using a three electrode tube as the amplifying means. Within tube (29) is placed a grid member (30), a filament (31) and a plate (32). The whole equipment is enclosed in a container (33).

Filament (31) is maintained at the desired operating temperature by means of a battery (34). Plate (32) is connected in series with a coil (35) and a relay member having core (36), armature (37) and an opposing coil (38).

Plate (32) is also connected in series with a variable resistance (39) and a battery (40) one terminal which is connected to filament (31). With the arrangement described, whenever the potential of grid (30) is varied with respect to filament (31) there will be a flow of current between filament (31) and plate (32) in the usual manner, this current being much greater than the change in potential of a grid (30) which is caused by photo-electric cell (27).

Coil (38) is connected in series with a variable resistance (41) and to the terminals (42) and (43) of generator (13).

Armature (37) of the relay operates to close contacts (44) and (45) which serve to actuate electrically operated valve (46) or equivalent mechanism.

Automatic valve (46) is connected to a source of liquid (47) by means of piping (48) and discharges said liquid into tank or container (21) when opened.

In operation it will be apparent that a light ray reflected from the mirrors on rotating member (5) passes alternately through column (18) and column (17) containing respectively the material to be tested and the standard material. It will be apparent therefore that coil (35) is subjected alternately to a current impulse which is proportioned first to the light transmitting power of the material to be tested and second to the light transmitting power of the standard material.

Since, however, generator (13) is so wound and synchronized that an electromotive force is produced in exact synchronism with the travel of the ray of light through the various mediums to be tested, coil (38) will be subjected to a flow of current which will be timed exactly with the flow of current in coil (35) but opposed in direction.

Rheostats (41) and (39) permit adjustment of current flow in coils (35) and (38)

such that the effect on core (36) of the current caused by the light ray travelling through sample medium (17), and the current produced by the generator (13), simultaneously will be approximately equal and opposite.

Under these conditions the effect of the currents flowing in coil (35) and (38) during the interval will balance and the relay will be unaffected.

If now the current produced by the light sensitive cell (27) when the ray of light travels through the tube (18) is appreciably less than the current produced when the light ray travels through tube (17), the effect of coil (35) and coil (38) on core (36) will unbalance.

Armature (37) of core (36) may be polarized. When the resultant magnetic effect on coil (36) due to coils (35) and (38) attracts armature (50) contacts (44) and (45) will be closed thus applying a source of potential (51) to automatically operate the valve (46) thus allowing solution to pass from container (47) into container (21).

It will be apparent therefore that if the opaqueness of the material in tube (18) is greater than that in tube (17) the automatic valve (46) will be actuated causing additional liquid to flow into container (21) thus diluting the material in tube (18), which in turn reduces the opaqueness of this material thus tending to maintain an equilibrium.

An indicating device (52) is shown diagrammatically attached to the circuit, the device serving to give a visual indication of the current flowing through coil (35). Device (52) is preferably constructed in the form of a direct current milliammeter.

An understanding of the operation of this equipment can be readily obtained by considering Figures 3 and 4 respectively. Referring to Figure 3 (53) indicates a base line upon which is drawn a curve shown in solid lines and indicated by (54) and (55). A second and reversed curve is drawn on base line (53) and indicated by (56) and (57).

In Figure 4 (53) indicates the same base line as in Figure 3 and other numbers similar parts as in Figure 3. Referring to Figure 3, it may be assumed that (54) indicates the curve of magnetic effect produced on core (36) by the amplified current from photo-electric cell (27) when actuated by the standard material. While curve (55) indicates the corresponding curve of magnetic effect produced on core (36) by the photo-electric cell (27), when submitted to the light travelling through the material whose opaqueness it is desired to maintain constant.

Curves (56) and (57) represent the magnetizing effect of coil (38) upon core (36) due to the current wave produced by generator (13) and which it will be noted is synchronized but opposite to the magnetic effect produced by the light rays travelling through the two materials being tested.

In Figure 3 it will be noted that curve (54) is equal and opposite to curve (56) and curve (57) is equal and opposite to curve (55) so that there is substantially no resultant magnetic effect upon core (36) and armature (50) is therefore not lifted and automatic valve (46) is not operated.

Referring now to Figure 4, the condition there illustrated shows the standard constant wave produced by generator (13) namely curves (56) and (57), and shows also the standard constant wave produced by light travelling through the standard sample in tube (17), namely curve (54). In this case, however, curve (55A) represents the magnetizing effect due to the current generated in photo-electric cell (27) when the light ray travels through the tube (18) containing the medium to be controlled. In this case, it is assumed that the density of medium (18) has increased which would in turn decrease the transmission of light through tube (18) to photo-electric cell (27) and thus materially reduce the current passing through coil (35) as a result of such light action. Since the current passing through coil (35) is materially reduced, the magnetizing effect upon core (36) would also be reduced and this is shown as curve (55A). Since curve (55A) is now materially less than curve (57), a balance is not obtained but a marginal magnetizing which is indicated by the shaded area (58) is available to operate the relay lifting armature (50) and thus to cause automatic valve (46) to operate. Obviously operating automatic valve (46) causes the addition of water from container (46) to container (21) thus diluting the mixture in container (21) and therefore diluting the material in sample tube (18). This promptly results in an increased transmission of light through tube (18) with a result that a balance is soon established and the conditions illustrated in Figure 3 again obtained. When this condition occurs, automatic valve (46) which is spring actuated, immediately closes and the addition of water or diluting material to tank (21) from tank (47) ceases.

It will be apparent therefore that the equipment outlined here provides means for automatically diluting a given stock of material to maintain constant light transmission.

Obviously conditions may be exactly reversed and tank (47) may contain for example a supply of dye or opaque material in which case the equipment may be employed to maintain the desired opaqueness.

In the description given above, the equipment is used to maintain a uniform condition of light transmission through a liquid or gaseous material. Illustrations of such conditions would be the maintaining of a constant concentration of wood pulp in solution, or the maintenance of a constant addition of lime to lime water and various other chemicals, dyes, etc.

In Figure 2, a diagrammatic arrangement is shown of a thin solid material such as a strip of paper, cardboard, film, etc. Similar numbers represent similar parts. In Figure 2, (60A) and (61A) indicate screens which may be interposed in the path of light ray to obtain the desired color, intensity of light balance. (62A) indicates a strip of solid material which is being tested and (63A), a standard sample of solid material having the desired characteristics, which it is wished to obtain. If (62) is considered to be a strip of paper, leaving a paper forming machine and (63) a standard sample of paper, it will be apparent that by controlling the flow of water from tank (47), (Figure 1) into a stock chest (21), the thickness of the sheet of paper (62) may be controlled in the usual manner known to the trade. The control obtained in this case, however, is automatic instead of manual which is the present practice.

I wish it to be understood that any features shown and described in this specification are to be taken as diagrammatic in being possible to make any substitutions and variations without departing from the spirit of my invention. For example, I may use any desired number of amplifying tubes or I may use other commercial forms of amplifiers. The relay which I have shown may be constructed in any well known forms all of which come in the scope of my invention. Instead of using the photo-electric cell indicated in (27) I may use a piece of light sensitive selenium or other material of this nature although I prefer photo-electric cell of the type indicated.

Various forms of generating equipment may be used as for example, a vibrating type of generator or a vibrated contact in which case of course, the light rays would be synchronized with the vibrations of the generating device. Thus I may use a vibrating electro-magnet carrying a mirror on the moving part in place of the system comprised by rotating member (5), generator (13) and motor (15). In this case I may also use the exciting current of vibrating device in coil (38) after properly controlling it by the variable resistance (41).

I wish to point out that certain important results are accomplished by the general arrangement of equipment which I have here described and claimed. For example, the arrangement which I have disclosed permits the use of a single light source and a single light sensitive cell for comparing two different materials. Such an arrangement overcomes the difficulties which would normally be inherent in a device of this kind due to variations in the amount of light produced as for example, fluctuations in voltage applied to the light, deterioration in the light source, etc. This arrangement also avoids variations due to a change in sensitiveness of photo-electric cell (27). Obviously, with the arrangement which I have disclosed may be operated off of any standard commercial circuit as for example, the normal lighting circuits and the equipment is simple, readily obtainable and inexpensive.

It is a fact that very large financial wastes occur continuously owing to the lack of means of controlling the concentration of such materials as dyes in the solution, wood pulp in the solution, amount of paint or pigma applied to cloth, paper, etc., and other similar cases.

The application of this equipment to the control of combustion in furnaces as for example in the producing of steam under boilers is evident. In this case, the sample of the products of combustion from the furnace is passed continuously thru container (18) and balanced against a desired standard in container (17). In case the opaqueness of the gases in container (18) increases, the mechanism causes automatic valve mechanism (46) to operate which would open the damper increasing the amount of air delivered to the furnace, thus reducing the smoke.

In Figure 5 I have shown a modified arrangement of equipment to accomplish a similar purpose to that shown in Figure 1. Referring to Figure 5, (60) indicates a source of light as for example, an ordinary incandescent lamp. The light passes from the filament or lamp (60) through a controlled opening in screen (61) to a mirror (62) located on a vibrating member (63). Member (63) may be constructed in any desired manner as for example, a rugged steel spring securely fastened at one end (64) and provided with an adjustable rider (65) arranged to control the period of vibration of member (63). The mirror (62) may be in the form of a prism or any desired reflecting surface. Vibrating member (63) is maintained in vibration during the operation of the device by an alternating current coil (66), actuated from a source of potential applied to terminals (67) and (68). Light rays which fall on mirror (62) are reflected to a second mirror (69) and as vibrating member (63) travels the light is passed alternately through container (70) and container (71) which represent respectively, the standard sample and the material being tested and controlled. Light ray passing through containers (70) and (71) fall on mirrors (72) and (73) respectively and are reflected to photo-electric cell (74) in the manner previously described. The terminals of photo-electric cells (74) are connected in series with a variable resistance (75) and a source of rectified current later to be described. One terminal of photo-electric cell (74) is connected to grid member

(76) of three electrode tube (77) while the other terminal of photo-electric cell (74) is connected to the filament (78) of tube (77). Filament (78) is connected in series with a coil (79), of a transformer and a variable resistance (80) arranged to control the amount of current and therefore the temperature of filament (78).

A transformer (81) is connected with its primary terminals to (67) and (68). Coil (79) serves as one secondary winding for transformer (81) and coil (82) serves as another secondary winding. A sample rectifier such as a vacuum tube (83) is connected in series with the terminals of coil (82) and serves as a source of potential for photo-electric cell (74) as previously described and a source of potential to be applied between grid (84) of tube (77) and filament (78). A variable impedance (85) is placed in series with this circuit the terminals of which are connected to coil (86) around core (87) of a relay member. Coil (88) is wound around core (87) and connected to secondary winding (82) of transformer (81) in such a manner that the rectified current delivered to coil (88) produces normally a magnetizing effect approximately equal and opposite to that produced by coil (86) when actuated by the amplified photo-electric current of cell (74) under the influence of light rays travelling through tube (70). Obviously, proper balance under these conditions may be obtained by the adjustment of the variable impedances mentioned including variable impedance (90) in series with coil (88).

It will be apparent that as long as the effect on tube (74) by light rays travelling through container (71) is the same, as the effect by light rays travelling through container (70), that the magnetizing changes acting on core (87) of the relay will remain balanced and the relay will remain open. As soon, however, as the intensity of light travelling through the two containers (70) and (71) is different, the magnetizing effects of coils (88) and (86) on core (87) will vary in the manner previously outlined and diagrammatically illustrated in Figures 3 and 4. Under these conditions the core (87) will attract core (91) causing contacts (92) and (93) and applying the potential from terminal (67) and (68) upon the desired automatic control equipment indicated diagrammatically by the rectangle (94). Automatic control equipment (94) may be employed as previously explained and described to open valves, close dampers, or perform other control operations.

Obviously the arrangement of equipment shown and described in connection with Figure 5, would be understood as diagrammatic and subject to many obvious modifications without departing from the scope of this invention.

The arrangement shown in Figure 6 illustrates another alternate form of my invention. In Figure 6 a ray of light indicated as (100) is directed upon a reflector (101). Reflector (101) is supported by vibrating member (102) which is fastened at one point to supporting member (103). An alternating current electro-magnet (104) is energized by terminals (105) and (106) and causes vibrating member (102) to oscillate continuously.

Vibrating member (102) carries contacts (107) and (108) arranged to close circuits respectively through windings (109) and (110) as member (102) vibrates.

The material whose density is being controlled is illustrated diagrammatically as being within container (111) while a standard used for comparison purposes is held within container (112).

Mirrors (113) and (114) respectively direct the beam from ray (100) successively through containers (111) and (112) as member (102) oscillates.

Mirrors (115) and (116) are arranged to reflect the beam of light after traveling through containers (112) and (111) respectively, to light sensitive cell (117).

Light sensitive cell (117) is connected in series with a source of current (118) and the grid (119) of a three-electrode tube (120). Tube (120) is used to amplify the currents produced in light sensitive cell (117). Obviously any other equivalent amplifying means could be employed. Tube (120) is provided with filament (121) actuated from a source of current (122). A plate member (123) in tube (120) serves to receive the amplified electrical impulses which are originated in light sensitive cell (117). The circuit from plate (123) includes filament (120), a source of current (124) vibrating member (102), and alternately contacts (107) and (108), and the respective windings (109) and (110). Windings (109) and (110) are equal in the number of turns, but opposite in direction. Core (124) is arranged to actuate armature (126) when the magnetic effect of windings (109) and (110) is not balanced. When armature (126) is attracted by core (125) contact (127) is closed, thus actuating automatic valve or other control mechanism (128) by source of current (129). Obviously one or all of the sources of current mentioned in this description may be combined, individual sources of current being shown in order to clarify the description of the equipment. The operation of the arrangement of equipment shown in Figure 6 is as follows:

Vibrating member (102) is maintained in synchronous vibration by magnet member (104) or any other suitable means.

As a result of the vibration of member (102) light ray (100) is successively deflected through container (111) and container (112) being alternately directed upon photo-electric cell (117). Photo-electric cell (117) therefore alternately permits a current to flow in the circuit of the grid member (119). The current flowing in grid member (119) will be proportional to the intensity of the rays of light passing through containers (111) and (112), and if the density of the material in containers (111) and (112) is such that the light absorption in each case is identical, the currents flowing in the grid circuit (119) will be equal for each impulse.

These currents will successively pass through windings (109) and (110) under the influence of current supply member (124).

When vibrating member (102) is at the upper portion of its travel, contact (107) will be closed permitting the current from plate circuit (123) to pass through coil (109). During this same interval, a light ray of (101) is deflected through container (111) so that the current following through coil (109) will be proportional to the opaqueness of material in container (111).

On the other hand when vibrating member (102) is at the lower portion of its stroke, contact (108) will be closed, thus permitting the current from plate member (123) to pass through coil (110) which, however, is wound in an opposite direction to coil (109). During this interval of time, light ray (100) is deflected through container (112) and the current passing through coil (110) is therefore proportional to the opaqueness of material in container (112). If the opaqueness of the materials in container (111) and (112) is equal the currents passing through coil (109) and (110) will be equal and opposite and core (125) will be subjected to an alternating magnetic force which will not lift armature (126).

If, however, the opaqueness of material in containers (111) and (112) is not equal the currents which alternately pass through coils (110) and (109) will not be equal, and there will accordingly be a constant magnetic force on core (125) which will lift armature (126) thus closing contact (127) and actuating control member (128).

Now, therefore, if container (111) holds a continuously changing sample of the material whose density is to be controlled and container (112) represents a test standard or a comparison material, then the system described above will operate to vary the density of sample (111) as required to obtain a constant result. The operation of member (128) in obtaining a control may cover a wide range of equivalents such as has been previously described and explained.

It will be apparent that the system described in this specification is independent of such variables of applied potentials, deterioration of light source, change in activity of photo-electro cell, variation of amplifiers, etc. In other words the equipment which I have invented gives constant results under all practical commercial conditions and independently of the usual variables which are normally encountered.

Having now fully described my invention, what I claim as new and wish to secure by Letters Patent in the United States, is as follows:

1. The process of automatically maintaining a constant density of material by alternately passing a beam of light from a single source through a standard and through the material to be controlled, causing said beam of light to produce currents varying with the opaqueness of the materials, balancing said currents against constant synchronized opposing currents so arranged that a variation in the opaqueness of the material being controlled will unbalance said currents and thus actuate a device for correcting the density of said material being controlled.

2. A device for controlling the density of a medium consisting of a source of light, means for directing rays from said source of light successively through a standard and said medium being controlled, light sensitive means actuated by said rays to produce a current varying with the opaqueness of said material being tested, a relay actuated by said varying currents, a winding on said relay actuated by a synchronized opposing current and a control equipment actuated by said relay for controlling the density of the material being tested.

3. In a device for automatically controlling materials, a device for successively deflecting a ray of light, a light sensitive relay and a control device actuated by said light sensitive relay.

4. In the process of automatically controlling the concentration of materials in solution, the step of passing a beam of light successively through a sample of material to be controlled and a standard sample, producing electrical forces proportional to the strength of said light rays, and balancing said electrical forces against synchronized opposing electrical forces.

5. The process of automatically controlling the concentration of wood pulp in water which consists in passing a ray of light successively through a sample of material to be controlled, and a standard, causing said ray of light to actuate a light sensitive relay and causing said relay to increase the quantity of water mixed with said wood pulp.

6. In the process of controlling the concentration of a medium in a fluid, the step of passing a ray of light successively through the medium to be tested and a standard and balancing the effect produced by said ray of light after passing through said medium to be tested against the effect produced after passing through said standard.

7. The process of automatically controlling the concentration of material in solution by passing a light ray successively through the solution to be tested and a standard, balancing the photoelectric effect produced in each case one against the other, and causing the unbalanced component to operate a control device.

8. The process of controlling the opaqueness of a material which consists of first passing a light ray from a common source successively through the material being controlled and a standard material, second directing said light rays to cause the flow of current from a device, third balancing said currents thus produced respectively against a pair of synchronized opposing currents of fixed value, and finally causing an unbalance between said balancing currents and said light currents, to operate a control device for restoring uniform opaqueness.

9. The process of automatically controlling the opaqueness of a material by passing a ray of light successively through said material and a standard, causing the variation of the light ray thus passed to actuate a control device for automatically maintaining constant opaqueness.

10. The process of automatically controlling the opaqueness of a material by means of its light transmission.

11. The process of automatically controlling the concentration of material in suspension in a fluid by passing a ray of light successively through the stock to be tested and a standard agitated sample of stock, causing said light ray to actuate a light sensitive relay and causing said relay to actuate a control device for changing the concentration of material in suspension.

12. The process of automatically controlling the concentration of pulp in suspension in a fluid by passing a ray of light successively through said stock to be tested and a standard sample of stock, causing said light ray to actuate a light sensitive relay, and causing said relay to actuate a control device for changing the concentration of the material in suspension.

13. A device for automatically controlling materials comprising a light source, a light deflecting device, a light sensitive device, a relay device and a control mechanism actuated by differences in light intensity from said light deflecting device.

14. A device for automatically controlling materials consisting of a synchronized light deflecting device, a light sensitive device, and a control mechanism actuated by differences in light intensity from said synchronized light deflecting device.

15. A device for automatically controlling the concentration of materials suspended in a fluid, consisting of a light producing device, a moving light deflecting device, a light sensitive relay, amplifying means, and a mechanism actuated from said light sensitive relay for automatically changing the concentration of said material.

WILLIAM A. DARRAH.